United States Patent
Goldberg et al.

(10) Patent No.: US 7,168,087 B2
(45) Date of Patent: *Jan. 23, 2007

(54) DISTRIBUTED PUBLISHING NETWORK

(75) Inventors: Jason Goldberg, San Francisco, CA (US); Tim Fredenberg, Pacifica, CA (US); Larion Vasilovsky, Pacifica, CA (US); Neal Bedard, Morgan Hill, CA (US); Ian MacDowell, San Francisco, CA (US)

(73) Assignee: XperEx Corporation, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,909

(22) Filed: Jul. 21, 2006

(65) Prior Publication Data

US 2006/0259941 A1 Nov. 16, 2006

Related U.S. Application Data

(63) Continuation of application No. 09/644,382, filed on Aug. 23, 2000, now Pat. No. 7,100,191.

(51) Int. Cl.
*H04N 7/173* (2006.01)
*H04N 5/91* (2006.01)

(52) U.S. Cl. ........................ 725/110; 386/95; 386/125; 386/126; 707/5

(58) Field of Classification Search ........ 725/109–110, 725/20; 386/83, 125, 126, 95; 705/1, 10, 705/27; 707/5
See application file for complete search history.

(56) References Cited

U.S. PATENT DOCUMENTS

| | | | | |
|---|---|---|---|---|
| 5,237,157 A * | 8/1993 | Kaplan | ................. | 235/375 |
| 5,557,317 A * | 9/1996 | Nishio et al. | ............... | 725/100 |
| 5,712,994 A * | 1/1998 | Jefferson et al. | ........... | 715/788 |
| 5,715,403 A * | 2/1998 | Stefik | ........................ | 709/229 |
| 6,032,130 A * | 2/2000 | Alloul et al. | ................. | 705/27 |
| 6,101,509 A * | 8/2000 | Hanson et al. | ............. | 715/513 |
| 6,112,212 A * | 8/2000 | Heitler | .................... | 715/501.1 |
| 6,202,210 B1 * | 3/2001 | Ludtke | ........................ | 725/80 |
| 6,401,202 B1 * | 6/2002 | Abgrall | ........................ | 713/2 |
| 7,100,191 B1 * | 8/2006 | Goldberg et al. | ........... | 725/110 |
| 2002/0007493 A1 * | 1/2002 | Butler et al. | ............... | 725/110 |
| 2002/0049607 A1 * | 4/2002 | Perkowski | .................... | 705/1 |
| 2002/0129046 A1 * | 9/2002 | Cole | .......................... | 707/203 |

* cited by examiner

*Primary Examiner*—Vincent F. Boccio
(74) *Attorney, Agent, or Firm*—Blakely, Sokoloff, Taylor & Zafman LLP

(57) ABSTRACT

A system and method for distributing of various media content is described. According to one embodiment of the present invention, a device is coupled to a remote server through a network. The device includes a storage memory that includes markup language content, wherein the remote server can update the markup language content through the network. Additionally, the device also includes a DVD drive having a DVD. Further, the DVD includes video content. The device also includes an overlay unit coupled to the storage memory and the DVD drive. The overlay unit overlays the markup language content over the video content to form combined content in a single window. Moreover, the device includes a video display to display the combined content in the single window.

17 Claims, 13 Drawing Sheets

DISTRIBUTED PUBLISHING NETWORK

CROSS-REFERENCE

This is a continuation of U.S. patent application Ser. No. 09/644,382, entitled "Distributed Publishing Network" filed Aug. 23, 2000 now U.S. Pat. No. 7,100,191.

FIELD OF THE INVENTION

The invention relates to networks. More specifically, the invention relates to a system and a method of distribution of data content into a multimedia-controlled environment.

BACKGROUND OF THE INVENTION

With the advent of the Digital Versatile Disc (DVD) in conjunction with the Internet, systems have been developed that attempt to synchronize the video content from a DVD-Video with HyperText Markup Language (HTML) text from the Internet. One application of such a system, which can be displayed on a computer monitor or a television screen, could be a movie being displayed from the DVD-Video, while an Internet browser application displays HTML text, which could include subtitles or background information related to the movie.

One example of such a system is the WebDVD system by MICROSOFT®. FIG. 1 illustrates a monitor screen of a WebDVD system. In particular, FIG. 1 illustrates computer monitor screen 100 that includes DVD screen 104 and Internet browser screen 106. Additionally, computer monitor screen 100 is attached to a computer (not shown), which includes a DVD drive (not shown). In addition to video content, a DVD-Video includes text sections for different usages. The WebDVD system inserts Uniform Resource Locator (URL) addresses associated with different web content located on the Internet into these text sections of a particular DVD-Video. In operation, the DVD drive displays the video content located thereon onto DVD screen 104. Moreover, when the DVD disc drive encounters a URL address, the drive transmits this address to an Internet browser application running on the computer. Subsequently, the Internet browser application retrieves the HTML text associated with this URL address and displays such content in Internet browser screen 106.

However, such systems suffer from limitations. One such limitation is the lack of a tight integration between the video content from the DVD-Video and the HTML content from the Internet, due in part to the design of a DVD-Video, as the number of text sections to place the URL addresses therein on a given DVD-Video is limited. Accordingly, updates to Internet browser screen 106 may not be able to occur as frequently as some applications need or desire.

Moreover, such systems lack a full integration between the video content from the DVD-Video and the HTML content from the Internet. In particular as illustrated in FIG. 1, computer monitor screen 100 includes two separate screens to display the video content in one screen and the HTML content in another screen.

A further limitation in such a system is that the URL address is burnt onto the DVD-Video, thereby precluding any dynamic modification of such addresses. Therefore if a given URL address stored on the DVD-Video needs to be modified, a new DVD-Video must be created to include this modification. These types of modifications can be costly and time-consuming.

In another system that synchronizes video content from a DVD-Video with HTML text, the sector numbers of the DVD-Video are employed to provide for such synchronization. In such a system, numbers of the sectors containing the video content of the DVD-Video are associated with certain HTML text. Accordingly, video is displayed such that when certain sectors of the DVD-Video are played by the DVD drive, HTML text is displayed in a separate screen for the number for the given sector. However, such a system also suffers from certain limitations. One such limitation is due in part to the modification of the sector locations on a DVD-Video each time a DVD-Video is burnt. Accordingly, the association between the sector numbers and the HTML text needs to be modified each time a DVD-Video is created.

SUMMARY OF THE INVENTION

A system and method for distributing of various media content is described. According to one embodiment of the present invention, a device is coupled to a remote server through a network. The device includes a storage memory that includes markup language content, wherein the remote server can update the markup language content through the network. Additionally, the device also includes a DVD drive to accept a DVD. Further, such a DVD would include video content. The device also includes an overlay unit coupled to the storage memory and the DVD drive. The overlay unit overlays the markup language content over the video content to form combined content in a single window. Moreover, the device includes a video display to display the combined content in the single window.

Another embodiment of the present invention includes a server that is coupled to at least one device through a network. The server includes a local directory structure that includes at least one directory having at least one file that includes data content. Each directory is associated with a device. Additionally, the server transmits at least one file from at least one directory to the associated device. The server also includes at least one script to be executed by a processor on the server. This script has commands to retrieve the data content from at least one remote server coupled to the network and to store the data content into a file within the local directory structure. Moreover, the server includes a database that includes system data that has been retrieved from the device. Another embodiment of the present invention includes a system that includes the device and server described above.

According to one aspect of the invention, a method includes receiving video content from a fixed storage media. Additionally, the method includes receiving data content from a dynamic storage media. The dynamic storage media receives the data content from a remote location through a network connection. Moreover, the method includes overlaying the data content onto the video content to generate a combined content in a single window. The method also includes the displaying of the combined content.

BRIEF DESCRIPTION OF THE DRAWINGS

Embodiments of the invention may be best understood by referring to the following description and accompanying drawings which illustrate such embodiments.

In the drawings.

DETAILED DESCRIPTION

In the following description, for purposes of explanation, numerous specific details are set forth in order to provide a thorough understanding of the present invention. It will be evident, however, to one skilled in the art that the present invention may be practiced without these specific details.

Figure 1:
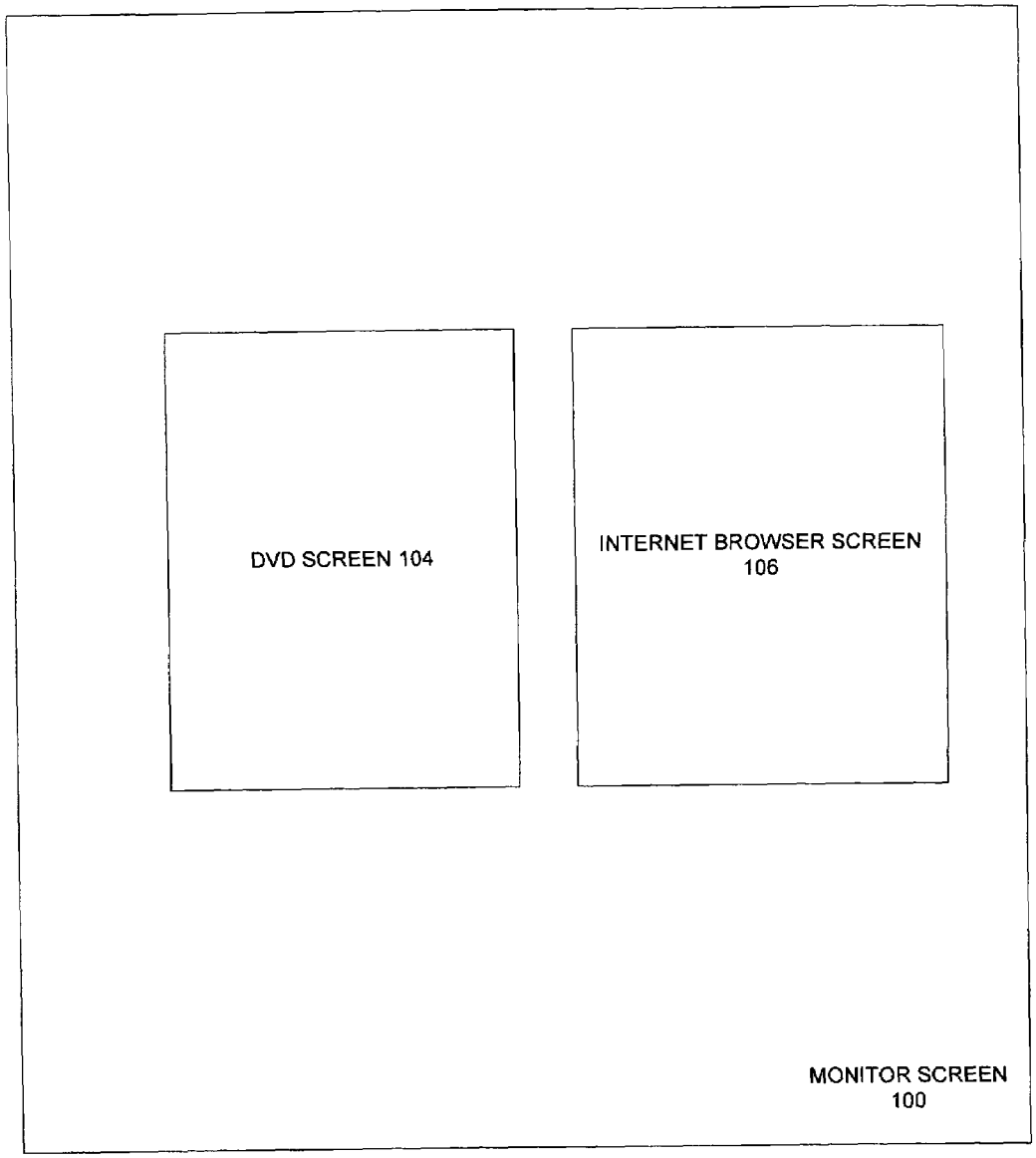
FIG. 1 illustrates a monitor screen of a WebDVD system.
Figure 2:
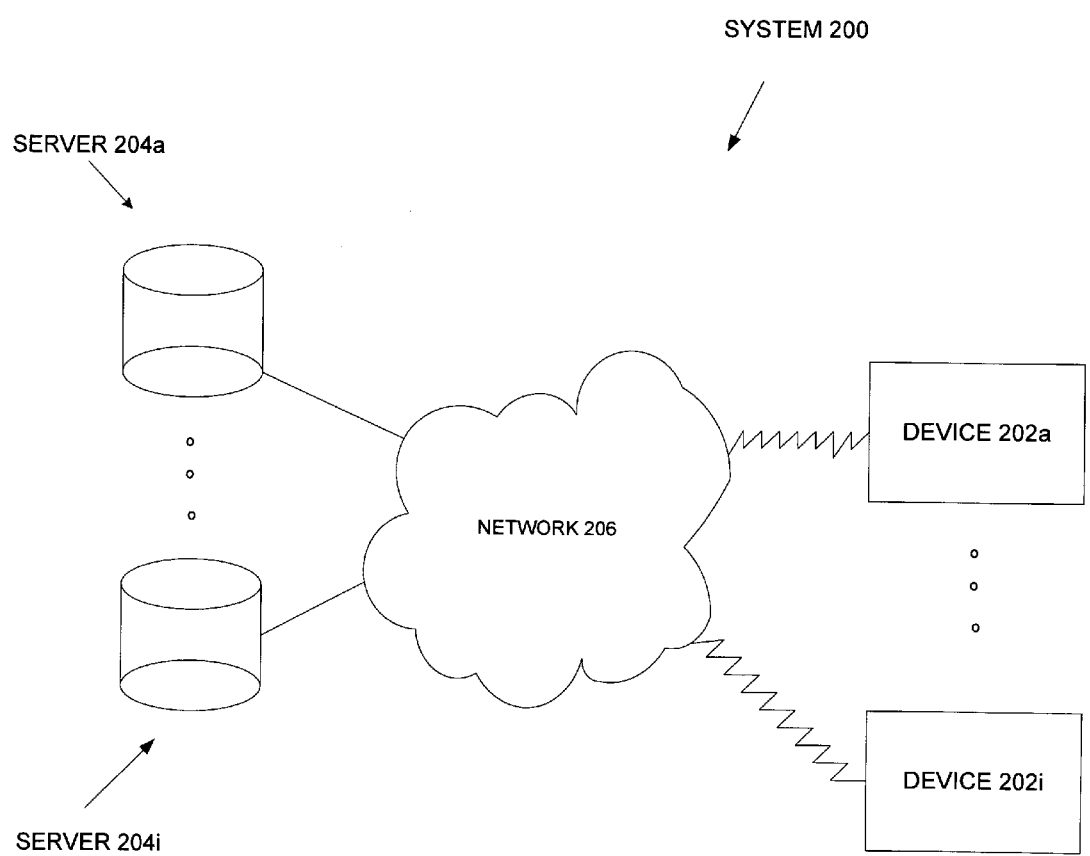
FIG. 2 is block diagram illustrating a system that incorporates embodiments of the present invention.

FIG. 2 is block diagram illustrating a system that incorporates embodiments of the present invention. In particular, FIG. 2 illustrates system 200 that includes devices 202a–i and servers 204a–i, which are coupled together through network 206. Devices 202a–i can include one to any number of such devices in system 200. Similarly, servers 204a–i can include one to any number of such servers in system 200. In an embodiment, there is a one-to-many relationship between a given server 204 and multiple devices 202. For example, devices 202a–c communicate exclusively with server 204a. However, embodiments of the invention are not so limited. For example, in another embodiment, there is a one-to-one relationship between a given server 204 and a given device 202. In a further embodiment, there is a many-to-one relationship between multiple servers 204 and a given device 202.

While different embodiments of the present invention could have different types of communication protocols between devices 202a–i and servers 204a–i, in an embodiment, the communication protocol between devices 202a–i and servers 204a–i is the HyperText Transfer Protocol (HTTP). Moreover, in one such embodiment, the communication protocol is upgraded to Secure-HyperText Transfer Protocol (HTTPS) to allow for increased security between devices 202a–i and servers 204a–i.

In one embodiment, network 206 is a local area network (LAN). In another embodiment, network 206 is a wide area network (WAN). In one such embodiment, network 206 is the Internet. Further, network 206 can be a combination of different networks that provide communication between servers 204a–i and devices 202a–i. While different embodiments could have different types of communication between network 206 and servers 206a–i and devices 202a–i, in one embodiment, devices 202a–i are coupled to network 206 through wireless communication, while servers 204a–i are coupled to network 206 through wired communication. Moreover, to allow for increased security regarding the communications between devices 202a–i and servers 204a–i, virtual private networks (VPNs) within network 206 can be established between a given device 202 and a given server 204.

Figure 3:
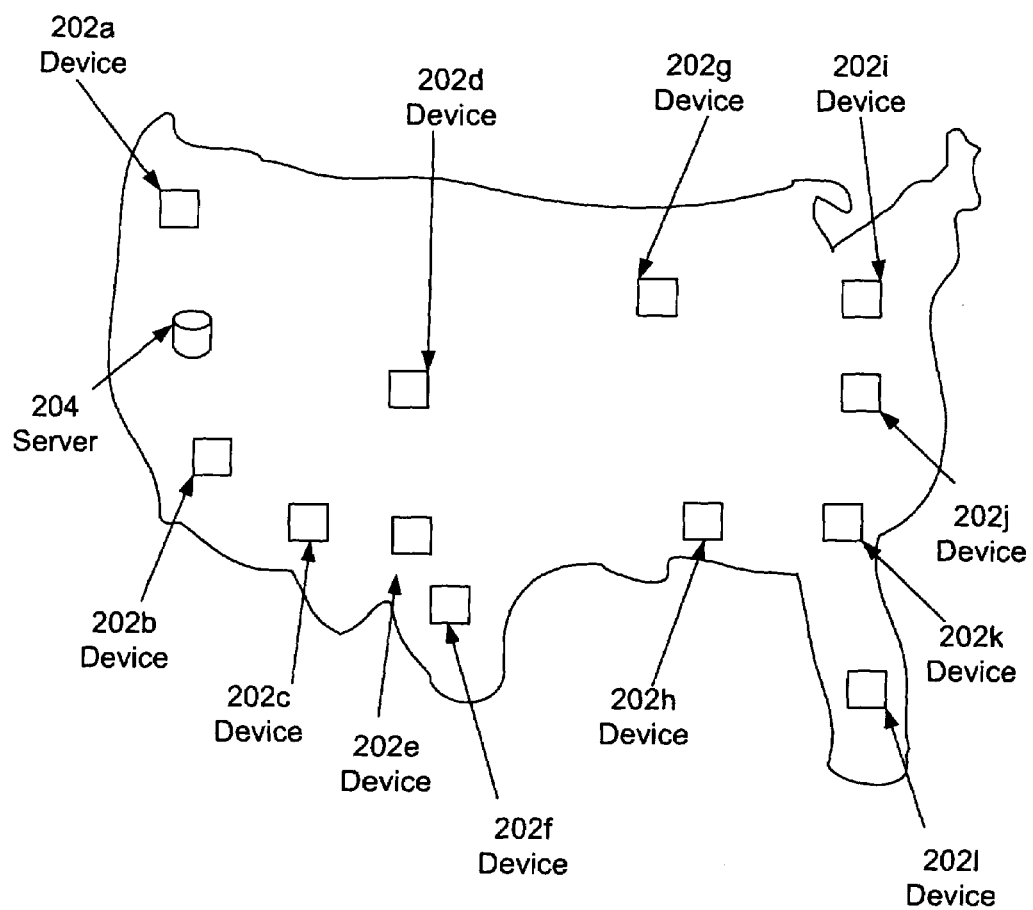
FIG. 3 illustrates one application of system 200, according to embodiments of the present invention.

FIG. 3 illustrates one application of system 200, according to embodiments of the present invention. In particular, FIG. 3 illustrates a map of the United States wherein server 204 and devices 202a–l are located in different locations across the United States. Additionally not shown for the sake of clarity, server 204 and devices 202a–l are coupled together through different networks, such as WANs and/or LANs. In operation, server 204 communicates with devices 202a–l. Such communication includes the downloading of data content and configuration data into devices 202a–l, to allow for the overlaying of such data content onto a video content, which can be stored locally on fixed storage media. For example, in one embodiment, this fixed storage media is a multimedia disc, such as a DVD, within devices 202a–l. Such overlaying and display of data content onto video content is described in more detail below. Moreover, communication between server 204 and devices 202a–l includes the uploading of status information, such as the title of the multimedia disc within multimedia drive 402, from devices 202a–l to server 204.

The application illustrated in FIG. 3 is by way of example and not by way of limitation, as embodiments of system 200 could be incorporated into other types of geographical locations while having different configurations. For example, system 200 could be incorporated into a global network spanning across different countries. In a further example, system 200 could include multiple servers 204 communicating with multiple devices 202.

In one embodiment, devices 202a–l are devices that include multimedia drives, such as DVD drives, that can be employed as in-store user terminals for Point-Of-Purchase (P-O-P) retail advertising and promotion networks. Additionally, other applications of devices 202 could include the placement such devices in airports, malls, etc.

Additionally, in one embodiment the store or location, which includes one to a number of devices 202, can also include a server that is coupled to network 206 through a wired connection, such as a T1 line or a Digital Subscriber Line (DSL). Further, devices 202 can wireless communicate with the server local to the store or location. In turn, this local server can then route this communication to server 204 over network 206, thereby enabling the local server to act as a router between devices 202 and server 204.

Figure 4:
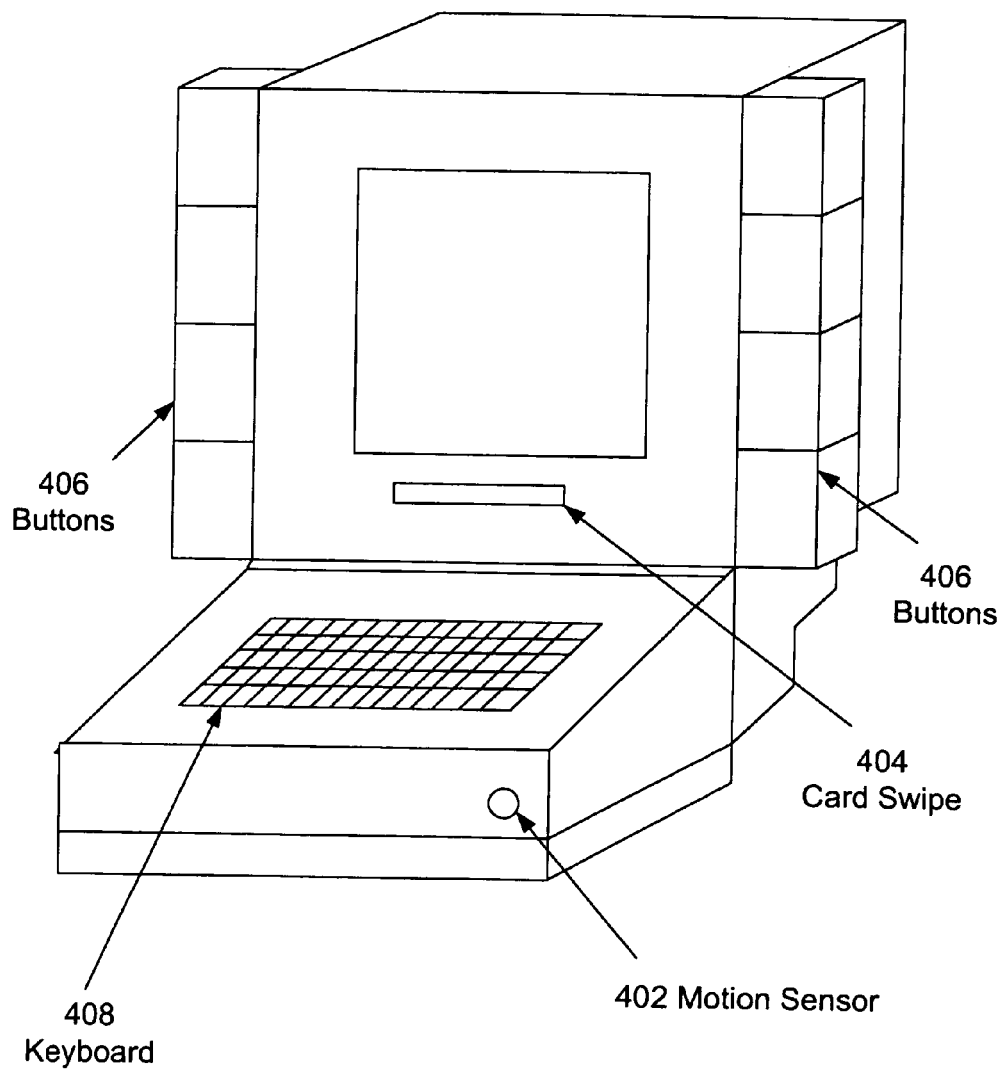
FIG. 4 illustrates device 202 and its associated user inputs, according to one embodiment of the present invention.

FIG. 4 illustrates device 202 and its associated user inputs, according to one embodiment of the present invention. In particular, as shown, the associated user inputs include motion sensor 402, card swipe 404, buttons 406 and keyboard 408. In an embodiment, motion sensor 402 is employed to detect movement within a certain range of devices 202, thereby causing its activation. For example, devices 202 could remain in an idle mode until motion is detected, which then begins a presentation to attract the user to devices 202. Such a presentation could include a video that starts with a talking head, which encourages the user to come closer to device 202 to watch the presentation.

Card swipe 404 is used to receive credit card data by having the user slide their credit card through card swipe 404. However, embodiments of the present invention are not limited to the receipt of credit card information. For example, in another embodiment card swipe 404 could also be employed to receive a user's information, such as the user's name and address, from a membership club card. Buttons 406 can be used for various user input data, such as the answering of multiple-choice type questions by the user. For example, the presentation of devices 202 may include asking the user personal information such as the user's gender or age group, wherein buttons 406 are associated with different answers to such questions. Moreover, keyboard 408 allows the user to enter alphanumeric data into devices 202, such as the user's name, address, credit card number, etc. The user inputs illustrated in FIG. 4 are by way of example and not by way of limitation as other user inputs could be include in device 202. For example, in one embodiment, a microphone could be employed to receive audio data from the user, which may be converted to digital data using voice recognition technology within device 202.

In one embodiment, devices 202a–l store high-bandwidth media, such as video, locally on a multimedia disc (e.g., DVD) therein, while allowing for low-bandwidth media to be updated from server 204 through a network connection. Examples of such low-bandwidth media includes data content concerning the latest product information or sales promotion for a product being sold in the given retail store. As another example, this data content can include promotional information for a sale on a product for a limited duration in order, for example, to move stagnant inventory within the store where device 202 is located. Accordingly, server 204 can download different data content to different devices 202 to meet a store's specific needs. Moreover, this network connection between server 204 and devices 202a–l also enable end-users to make purchases of products directly from devices 202a–l, as purchases requests are uploaded to the remote server from such devices. Accordingly, for the end-user (e.g., retail store customer and/or sales clerk), devices 202a–l provide a responsive, up-to-date, easy-to-use interactive experience with the additional benefit of high-quality full motion video. In particular, a given device 202 can be dedicated to a given vendor's product or set of products. Accordingly, device 202 can provide an integrated multimedia product presentation, sales promotion and/or allow for e-commerce transactions for given products of the particular vendor.

In an embodiment, high-bandwidth media can also be downloaded from server 204 into memory of device 202, instead of being stored on a multimedia disc. In one such embodiment, this high-bandwidth media is downloaded during off-peak times of usage of device 202. For example, such media can be downloaded when the store wherein device 202 is located is closed.

Figure 5:
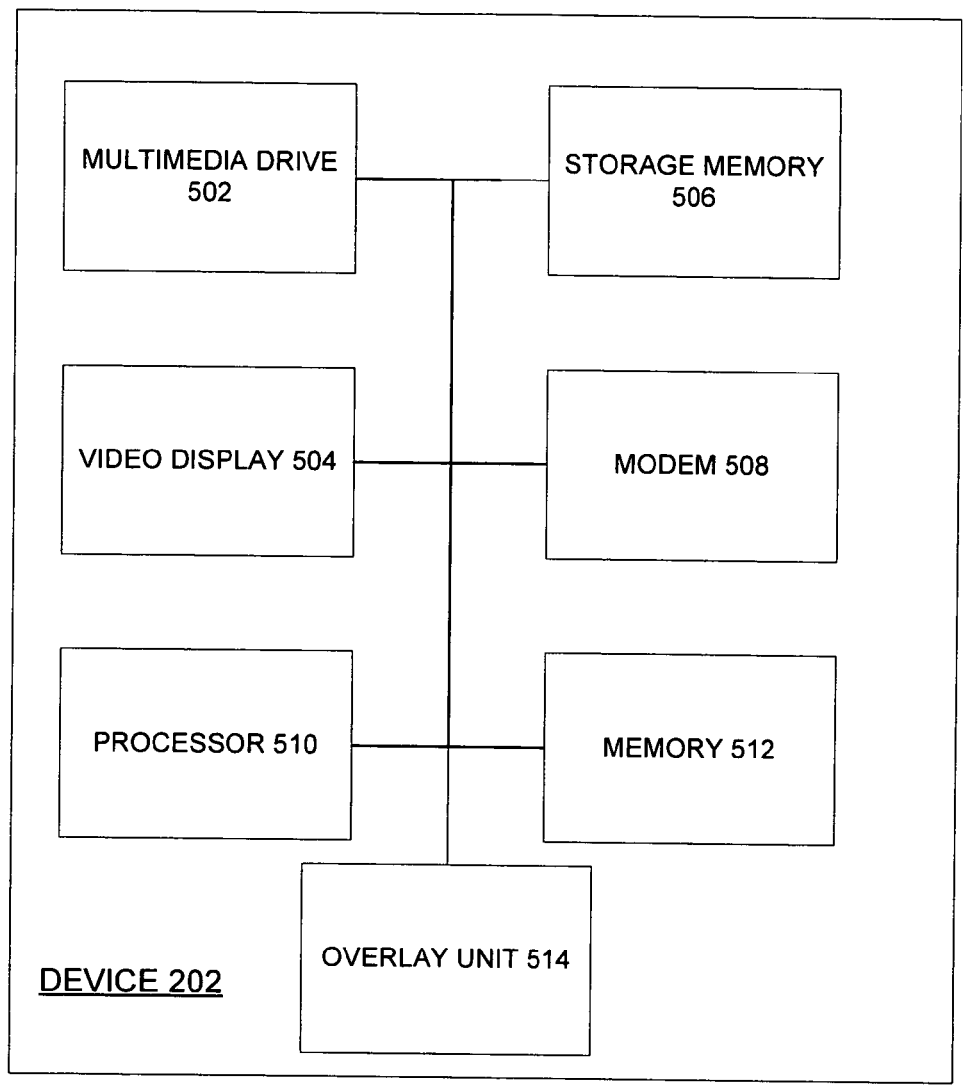
FIG. 5 illustrates a more detailed block diagram of the hardware components of devices 202, according to embodiments of the present invention.

FIG. 5 illustrates a more detailed block diagram of the hardware components of devices 202, according to embodiments of the present invention. As shown in FIG. 5, in one embodiment, device 202 includes multimedia drive 502, storage memory 506, video display 504, modem 508, processor 510, memory 512 and overlay unit 514, which are all coupled together.

Multimedia drive 502 includes a fixed storage media, such as a DVD. In such an embodiment, multimedia drive 502 is a DVD drive. However, embodiments of the present invention are not so limited. For example, in other embodiments, multimedia drive 502 could be a Compact Disc-Read Only Memory (CD-ROM) drive, which reads a CD-ROM. Moreover, storage memory 506 can be various types of memory. In one embodiment, storage memory 506 is a dynamic storage media that can be updated. In one such embodiment, storage memory 506 is a FLASH memory. In an embodiment, device 202 is shipped to a given location such that storage memory 506 does not include data. Accordingly, when device 202 is coupled to network 206, communications is established between device 202 and server 204 wherein server begins downloading data content into storage memory 506, which is described in more detail below. In one embodiment, the fixed storage media being read by multimedia drive 502 is larger in size than the dynamic storage media of storage memory 506.

With regard to modem 508, this device can be a landline modem or a wireless modem. In an embodiment where modem 508 is a wireless modem, the Cellular Digital Packet Data (CDPD) communication standard is employed. Moreover, this device is termed and described as a modem. However, embodiments of the present invention are not so limited, as this device could be any other type of wired or wireless network connection device. For example, in one embodiment this device could be a communication device to connect to a Digital Subscriber Line to couple to network 206.

Overlay unit 514 is described below in conjunction with FIGS. 10a–10c. Additionally, processor 510 can be any of a variety of different types of processing units. In one embodiment, processor 510 is an embedded microprocessor internal to device 202. Moreover, memory 512 can be a variety of different types of memories. In one embodiment, memory 512 is a random access memory (RAM). However, embodiments of the invention are not so limited as memory 512 can be other types of memory. These components of device 202 are described in further detail in conjunction with the software controlling such components in FIGS. 6a–6b below.

Figure 6A:
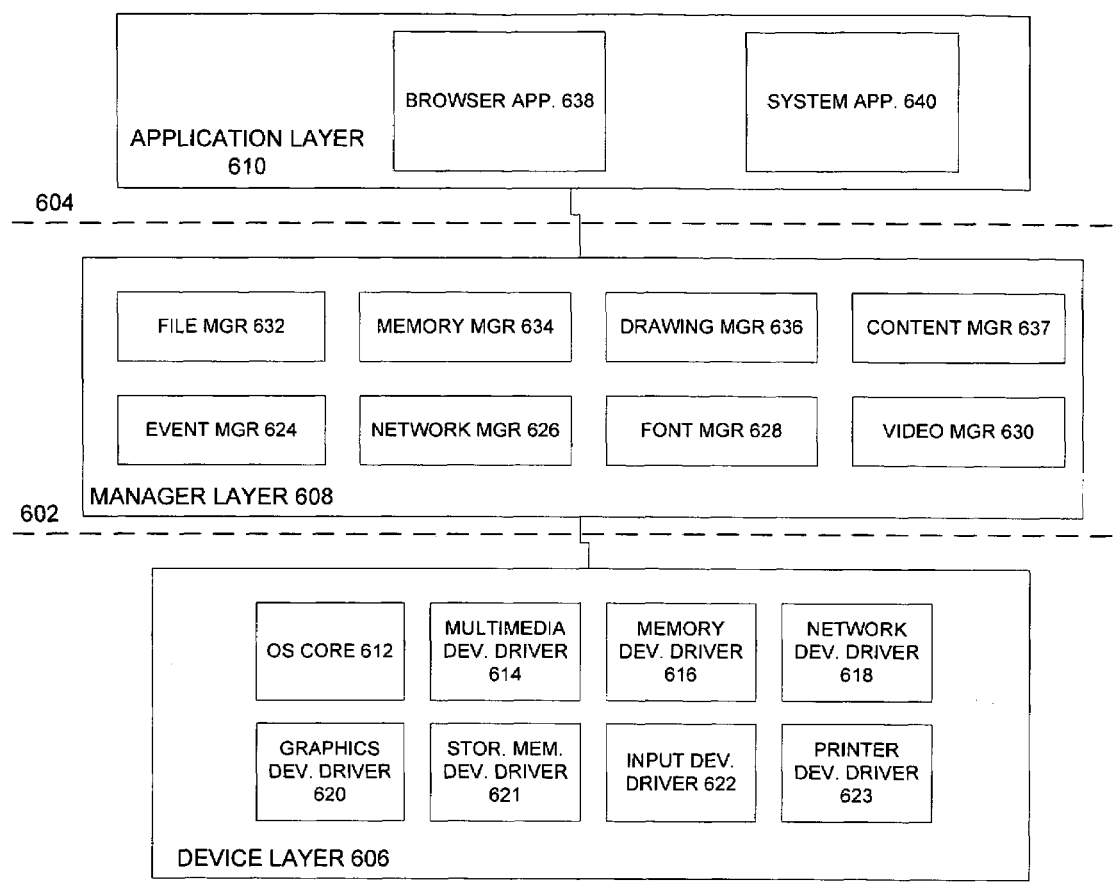
FIGS. 6a–6b illustrate a more detailed diagram of the software residing in memory 512 and executing on processor 510.

In particular, FIG. 6a illustrates a more detailed diagram of the software residing in memory 512 and executing on processor 510. Table 1 below identifies the software with respect to the dashed lines in FIG. 6a.

TABLE 1

| Dashed Lines | Software |
| --- | --- |
| Below 602 | Device Layer 606 |
| Between 602 and 604 | Manager Layer 608 |
| Above 604 | Application Layer 610 |

As illustrated in FIG. 6a, the software of device 202 includes three layers: (1) device layer 606, manager layer 608 and application layer 610. Device layer 606 operates the system code. This layer includes operating system (OS) core 612, multimedia device driver 614, memory device driver 616, network device driver 618, graphics device driver 620, storage memory device driver 621, input device driver 622 and printer device driver 623. In one embodiment, operating system core 612 is the Thread X Real Time Operating System. OS core 612 includes the source code from the OS, as well as system code to manage system utilities, processes and threads.

These device drivers control and communicate with the hardware components of device 202 including those illustrated in FIG. 5. Moreover, the software in device layer 606 communicates with the software residing in manager layer 608. Accordingly, one function of device layer 606 is to act as a conduit through which the upper software layers communicate with the hardware of device 202. In particular, multimedia device driver 614, memory device driver 616, network device driver 618, graphics device driver 620, storage memory device driver 621, input device driver 622 and printer device driver 623 provide standard interfaces between the hardware and the various managers in manager layer 608, which are further described below. These standard interfaces allow for easy addition, upgrade and/or update to the hardware of device 202.

Multimedia device driver 614 provides the low-level control of multimedia drive 502, while memory device driver 616 provides the low-level control needed for memory 512. Moreover, since memory device driver 616 is used for file storage, this device driver registers itself with file manager 632 to enable the storage of data into memory 512.

Network device driver 618 handles the sending and receiving of data through modem 508. In one embodiment, network device driver 618 uses Serial Line Internet Protocol (SLIP) for this sending and receiving of data through modem 508. Network device driver 618 passes data from modem 508 to network manager 626 for processing by the upper layers of software, such as browser application 638. Further, network device driver 618 sends out data to modem 508 received from network manager 626. In other words, network device driver 618 is an interface to modem 508 for network manager 626. During initial activation of device 202, network device driver 618 calls network manager 626 to get the address of a function for a callback to send data received from modem 508 when such data is received. In one embodiment, device 202 includes multiple network device drivers. Accordingly, this will enable device 202 to ship with different types of modems, including both landline and wireless, which can be selected when device 202 is installed and configured.

Graphics device driver 620 provides low-level access to video display 504. Additionally, input device driver 622 interfaces with the various hardware input devices, such as those illustrated in FIG. 4 and sends input events from such devices to event manager 624, which will posts these events to the queue of the process having control of device 202. In particular, at different times of operation of device 202, a particular process, such as browser application 638 or content manager 637, executing therein receives and processes incoming data from the various hardware input devices, thereby allowing such process to have control of device 202. This control among different processes within device 202 and the switching among such processes are more fully described in co-filed, co-pending patent application titled, "Method and Device with DVD and HTML Control Environments" to Tom Sharples, Tom Dezoglio and Bhupesh Vyas, which is hereby incorporated by reference.

Printer device driver 623 sends data to a printer that can be attached to device 202. Printer device driver 623 is controlled by a number of software managers including drawing manager 636 and font manager 628. Printer device driver 623 translates the data passed from drawing manager 636 and font manager 628 to data the attached printer can use to print.

Manager layer 608 includes system software managers: (1) event manager 624, (2) network manager 626, (3) font manager 628, (4) video manager 630, (5) file manager 632, (6) memory manager 634 and (7) drawing manager 636. These software managers are device or hardware independent with standard functions for communication with the software in device layer 602 and application layer 610.

Event manager 624 includes an event queue for each process and keeps track of the current process that is in control. Event manager 624 provides a hardware independent way of posting events within device 202. When a new input device driver is added to the system of device 202, this device driver will write its received input from the given input device to use events defined by event manager 624 that match the results device 202 needs to control the system. Moreover, event manager 624 provides for inter-process event posting among the different processes executing within device 202. In one embodiment, this inter-process event posting employs URLs with resource identifiers that are local to device 202. For example, to post an event to browser application 638, the resource identifier, "browser:" is used. Further, when a new process starts on device 202, this process registers its name with event manager 624. Accordingly, this process name is used in the resource identifier to post events to the different processes.

Network manager 626 interfaces with modem 508 through network device driver 618 for the transmission and receipt of data from server 204 or other remote devices coupled to network 206. Such data can include different types of markup language (i.e., presentation language) which includes command sequences embedded into the text. One example of such markup language is HTML.

In an embodiment, network manager 626 employs a Transmission Control Protocol/Internet Protocol (TCP/IP) protocol to communicate with remote devices, such as server 204. In another embodiment, network manager 626 employs a User Datagram Protocol/Internet Protocol (UDP/IP) protocol to communicate with such remote devices. In one such embodiment, network manager 626 uses sockets to provide communication between device 202 and server 204, thereby allowing for a device independent networking protocol. Moreover, font manager 628 displays text onto video display 504 and other output devices, such as a printer attached to device 202, using the output devices drivers including graphics device driver 620 and printer device driver 623.

Video manager 630 provides for Moving Pictures Experts Group (MPEG) decoding and displaying of the decoded video content from the multimedia disc, such as DVD-Video, being played by multimedia drive 502. Additionally, video manager 630 provides for the integration and displaying of the video content from the multimedia disc and the data content from storage memory 406, which is more fully described below.

File manager 632 handles the task of storing and retrieving files on device 202 to various types of storage thereon, including storage memory 506. Moreover, file manager 632 handles file allocation tables, which track the file locations on a given storage area. File manager 632 also recreates the stored files for the different applications on device 202 to use. In one embodiment, file manager 632 employs URLs to communicate and obtain files from the different types of hardware of device 202. Accordingly, the device drivers associated with the different type of hardware register themselves with file manager 632, thereby allowing file manager 632 to store and retrieve data therefrom. In one embodiment, this registration includes a unique resource identifier associated with the particular hardware. For example, in order for data to be stored in storage memory 506, storage memory device driver 621 registers with file manager 532, thereby making file manager 632 aware of storage memory 506. For registration of storage memory 506, a unique resource identifier could be "storage memory."

Memory manager 634 provides memory management for storage devices of device 202, including memory 512. Examples of memory management include the allocation, freeing and garbage collection of memory within such storage devices of device 202. In one embodiment, memory manager 634 includes one heap, which the different processes of device 202 share. Further, drawing manager 636 provides drawing graphics to the various output devices of device 202, such as video display 504.

Additionally, application layer 610 includes browser application 638 and system application 640. Browser application 638 is an application operating on device 202 that provides for the communication with server 204. In one embodiment, a digital certificate is employed in the communications between device 202 and server 204 for added security. Further, browser application 638 provides for the integration of the data content, which is downloaded from server 204 and stored in storage memory 506, with the video content from multimedia drive 502, which is described in further detail below System application 640 provides several functions for device 202. One such function includes the collecting and compiling of system information of device 202, which is subsequently transmitted to server 204 through browser application 638. Types of system information collected by system application 640 include debugging or performance data to enable the remote debugging of devices 202 from server 204.

Moreover, system application 640 monitors a port that is coupled to network 206. In particular, system application 640 monitors this port for messages from server 204. One such message from server 204 includes a message to have device 202 contact server 204. Upon receipt of such a contact message, system application 640 transmits a message to browser application 638, which causes browser application 638 to set up a network connection between device 202 and server 204 for the receipt of new data.

In one embodiment, system application 640 monitors the date and time of device 202 and compares these data to a callback value, which has been passed in from server 204 as part of the system and configuration data. When the callback value matches the date and time of device 202, system application 640 communicates to browser application 638 to set up a communication link between device 202 and server 204. Accordingly, this callback value allows for periodic uploads and downloads between device 202 and server 204.

Figure 6B:
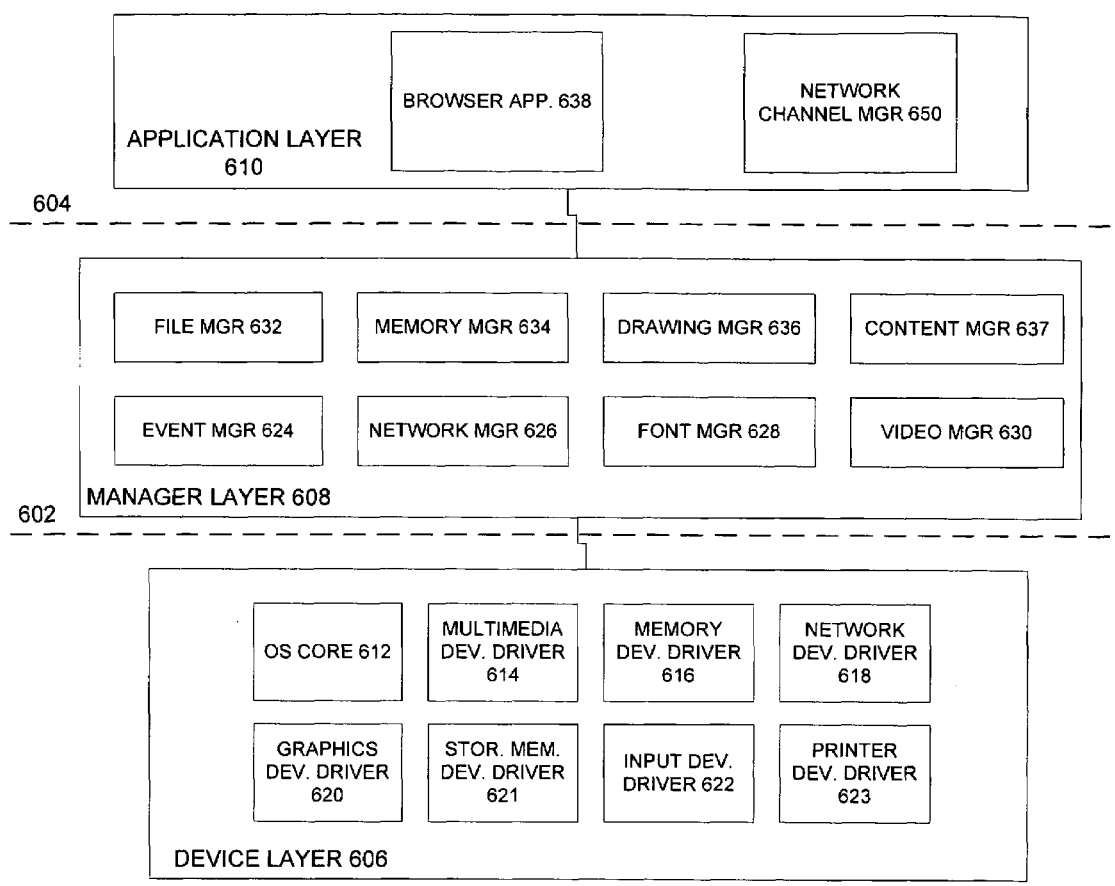

FIG. 6b illustrates an alternative embodiment of a more detailed diagram of the software residing in memory 512 and executing on processor 510. In particular, the embodiment illustrated in FIG. 6b includes similar software components as those illustrated in FIG. 6a. However as shown, the embodiment of FIG. 6b includes network channel manager 650 in substitution of system application 640. Moreover, as will be described in more detail below in conjunction with FIG. 10, modifications are made to the existing software components. In particular, network channel manager 650 provides a channel-based interface with server 204 for the communications between device 202 and server 204. A channel is defined to include a communication stream between device 202 and server 204 and is associated with a given input/output port of device 202 and 204.

In one such embodiment, multiple channels can be established between device 202 and server 204 such that each channel is dedicated to a particular communication. For example, one channel could be responsible for delivering usage statistics from device 202 to server 204, thereby allowing data mining concerning the usage patterns of users of device 202. Another example of a channel to be established between device 202 and server 204 could be a control/status channel that allows server 204 to control device 202 as well as request status therefrom. For example, server 204 could employ a control/status channel to update the time of day, the date, etc. Another type of channel that can be established between device 202 and server 204 is a content update channel, which allows server 204 to deliver updated and/or new data to device 202. The above-described channels are by way of example and not by way of limitation, as other types of channels can be established between device 202 and server 204. For example, an error channel can be established between device 202 and server 204. Such a channel enables device 202 and/or server 204 to communicate to each other concerning errors occurring therein. Network channel manager 650 along with the above-described channels will be described in more detail below in conjunction with FIG. 10.

Figure 7:
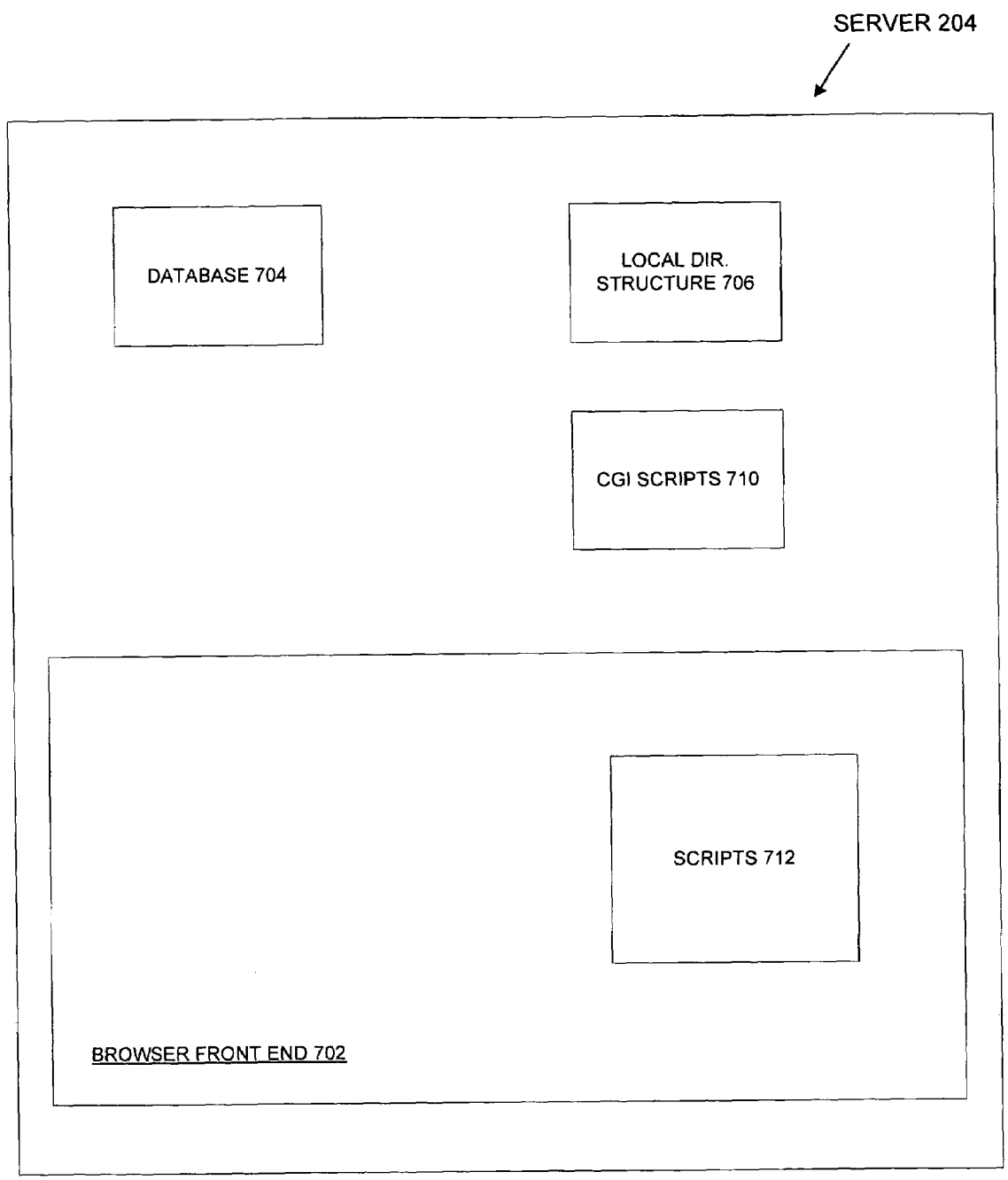
FIG. 7 illustrates server 204 of FIG. 2, according to embodiments of the present invention.

FIG. 7 illustrates server 204 of FIG. 2, according to embodiments of the present invention. In particular, server 204 includes browser front end 702, which includes scripts 712. Scripts 712 are defined to include any type of scripts or markup language tags, which are included in the markup language content. In one embodiment, scripts 712 are J-scripts. Additionally, server 204 includes database 704, local directory structure 706 and Common Gateway Interface (CGI) scripts 710. In an embodiment, browser front end 702 can include multiple browsers.

Local directory structure 706 includes storage space within server 204 employed to store data content that can later be downloaded into different devices 202. In one embodiment, local directory structure 706 includes a directory for each device 202 communicating with server 204. Accordingly, the data content for a given device 202 is stored within its own directory. Moreover, such directories have a unique URL. For example, device 202a could have a URL: "http://www.tscan.com/device202a", while device 202b could have a URL: "http://www.tscan.com/device202b". Further, device 202 and/or browser front end 702 can run one of CGI scripts 710 to access directories or files within the directories of local directory structure 706. For example, running one of CGI scripts 710, device 202 can remote copy an entire directory structure back to its storage memory 506.

In particular, CGI scripts 708 include (1) programs, executed by server 204, that allow for the retrieval and setting of data content at device 202, and (2) programs, executed by device 202, that allow for the collection of data content (files) from web sites residing on other servers coupled to network 206, which is needed to update device 202, as well as for the collection of information from device 202. In an embodiment, HTML forms are used to retrieve and set the data content of device 202.

In one embodiment, to retrieve data content from web sites residing on other servers, a script, residing on server 204 and executed by device 202, recursively retrieves HTML content and related files of a WEB subtree from different servers coupled to network 206 based on an HTTP URL and stores this HTML content in the given directory for device 202 within local directory structure 706. For example, if the script recursively retrieves HTML content and related files from a WEB subtree having a HTTP URL of "http://www.store1.com", the script retrieves the HTML content and related files from this directory, but also any subdirectories beneath this directory. For example, if there is a subdirectory "http://www.store1.com/sub1", the script also copies the HTML content and related files in this directory. Further, in one embodiment, this script also recursively retrieves HTML documents and related files references in HTML anchor tags located in the HTML documents and files of the WEB subtree.

In one embodiment, this script is Web EXtractor (WEX). In another embodiment, this script is WebCopy. In one embodiment, the HTML documents retrieved are modified such that the graphics are removed, thereby leaving only the text portion of such documents. Moreover, the multimedia disc stored in multimedia drive 502 is created to include the graphics (e.g., video content), which were removed. Accordingly, the high bandwidth data is stored locally on device 202 while the lower bandwidth data, such as the data content, can be transferred and updated from a remote location, as necessary. However, embodiments of the present invention are not so limited. For example, in one embodiment, such documents that include the graphics are downloaded into device 202 without the removal of such graphics. Accordingly, device 202 can ignore the graphics being received while storing the data content from such documents.

Figure 8:
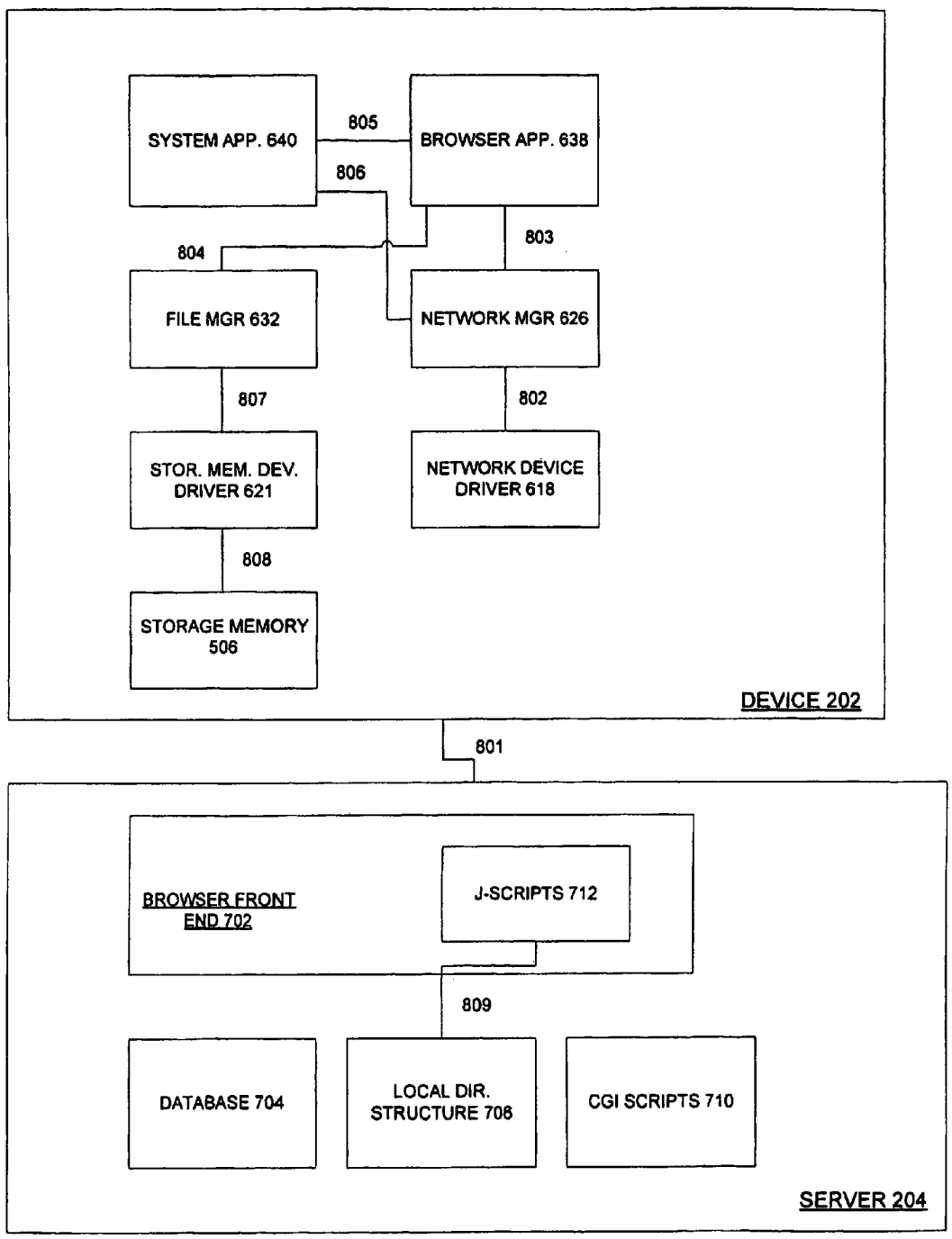
FIG. 8 illustrates a data transfer from server 204 to device 202, according to embodiments of the present invention.

FIG. 8 illustrates a data transfer from server 204 to device 202, according to embodiments of the present invention. In addition to components of device 202 and server 204, FIG. 8 includes communication paths 801–808, which are paths of communications within and between device 202 and server 204.

To transfer data content and/or configuration information, such as HTML pages, to device 202, server 204 copies the files having such data content to a directory associated with this given device. This placement of these files to the designated directory is needed, as server 204 may communicate with and control multiple devices. In particular, because different devices may have different data content and/or configuration data, this directory structure enables the segregation of such content between the different devices. Moreover, such directories are protected to enable the copying of files therein to be transmitted only to the associated device. In one embodiment, a source of data content is from web sites residing on remote servers, whose transfer is describe above in conjunction with FIG. 7. However, embodiments of the present invention are not so limited, as data content can be received from other sources. For example, an administrator may enter the data content directly onto server 204.

Subsequently, server 204 transmits a communication stream to system application 540. In particular, server 204 transmits this communication stream to device 202 through communication path 801. Network device driver 518 receives this stream at a port of device 202 and transmits this stream to system application 640 through network manager 626 using communication path 802 and communication path 806.

Through communication path 805, system application 640 commands browser application 638 to set up a network connection between device 202 and server 204 for downloading of data from server 204 to device 202. Browser application 638 then sets up a network connection and downloads data into storage memory 506. In particular, browser application 638 transmits a connection request to network manager 626 through communication path 803. Network manager 626 then transmits this request to network device driver 618 through communication path 802. Subsequently, network device driver 618 establishes a network connection with server 204. In one embodiment, browser application 638 employs a URL address, such as "http://www.tscan.com/device1/new_content/load.html" to download the data. In such an embodiment, this URL address contains a Common Gateway Interface (CGI) script, which has been created on server 204. Accordingly, this HTML page contains a CGI script to load all the new files needed to update device 202 with the latest content.

In particular, the CGI script causes the transfer of the needed data content from server 204 to device 202 through communication path 801. In one embodiment, all of the files within the associated directory are downloaded to device 202. In another embodiment, a lesser number of files within the associated directory are downloaded to device 202. This download configuration is changed through modifications of this CGI script residing on server 204. For example, the CGI script could be coded to retrieve a particular file or the entire file structure within the associated directory.

Moreover, in one embodiment, multiple CGI scripts for a given device 202 reside on server 204, wherein server 204 communicates to device 202 which CGI script to execute for a given communications session. For example, in one communications session, only the table, which contains the General Program (GPRM) data register values, associated addresses and time codes may need to be updated, which are further described in co-filed, co-pending patent application titled, "Integration of Passive Text in Multimedia-Controlled Environment" to Susan Baum, Tom Dezoglio and Bhupesh Vyas, which is hereby incorporated by reference. In a further example, in a given communications session, only one HTML web page and associated script for control mode switching may need to be updated, which is further described in co-filed, co-pending patent application titled, "Method and Device with DVD and HTML Control Environments" to Tom Sharples, Tom Dezoglio and Bhupesh Vyas.

Subsequently, network device driver 618 communicates such data to browser application 638 using network manager 626 through communication path 802 and communication path 803. Accordingly, browser application transmits this data to file manager 632 through communication path 804, and file manager 632 transmits this data into storage memory 506 using storage memory device driver 621 through communication paths 807–808.

Figure 9:
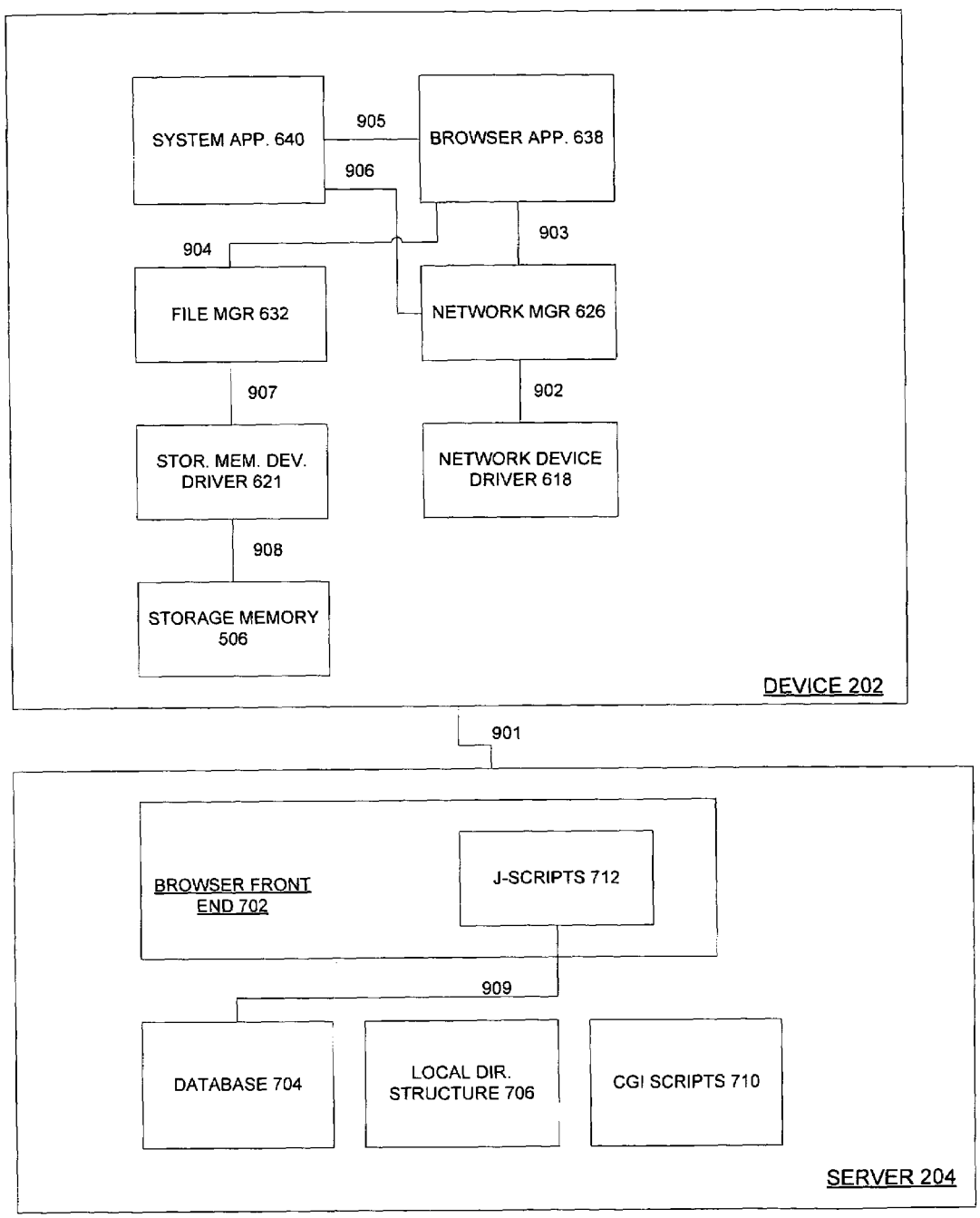
FIG. 9 illustrates a data transfer of data content from device 202 to server 204, according to embodiments of the present invention.

FIG. 9 illustrates a data transfer of data content from device 202 to server 204, according to embodiments of the present invention. Similar to FIG. 8, in addition to components of device 202 and server 204, FIG. 9 includes communication paths 901–909, which are paths of communications within and between device 202 and server 204.

To transfer data, such as configuration or performance information, back to server 204 from device 202, either server 204 or device 202 requests a communication session with the other through communication path 901. If the request for communication is from server 204, network device driver 518 receives this request at a port of device 202 and transmits this stream to system application 640 through network manager 626 using communication path 902 and communication path 906.

Through communication path 905, system application 640 commands browser application 638 to set up a network connection between device 202 and server 204 for uploading of data from device 202 to server 204. Browser application 638 then sets up a network connection and uploads data from storage memory 506 into database 704 of server 204. In particular, browser application 638 transmits a connection request to network manager 626 through communication path 903. Network manager 626 then transmits this request to network device driver 618 through communication path 902. Subsequently, network device driver 618 establishes a network connection with server 204.

Upon establishing the connection, browser application 638 uploads the requested data. In particular, browser application 638 transmits a request for the data to file manager 632 through communication path 904. File manager retrieves this data from storage memory 506 using storage memory device driver 621 through communication paths 907–908 and transfer such data to browser application 638 through communication path 904. Accordingly, using the established connection between device 202 and server 204, browser application 638 uploads the data into database 704 through communication paths 903, 902, 901 and 909.

As previously described, at different times of operation of device 202, the control of such a device dynamically changes between different processes executing therein, which is described in more detail in co-filed, co-pending patent application titled, "Method and Device with DVD and HTML Control Environments" to Tom Sharples, Tom Dezoglio and Bhupesh Vyas. In one such embodiment, the control modes within device 202 include an active text mode and an active video mode.

Figure 10:
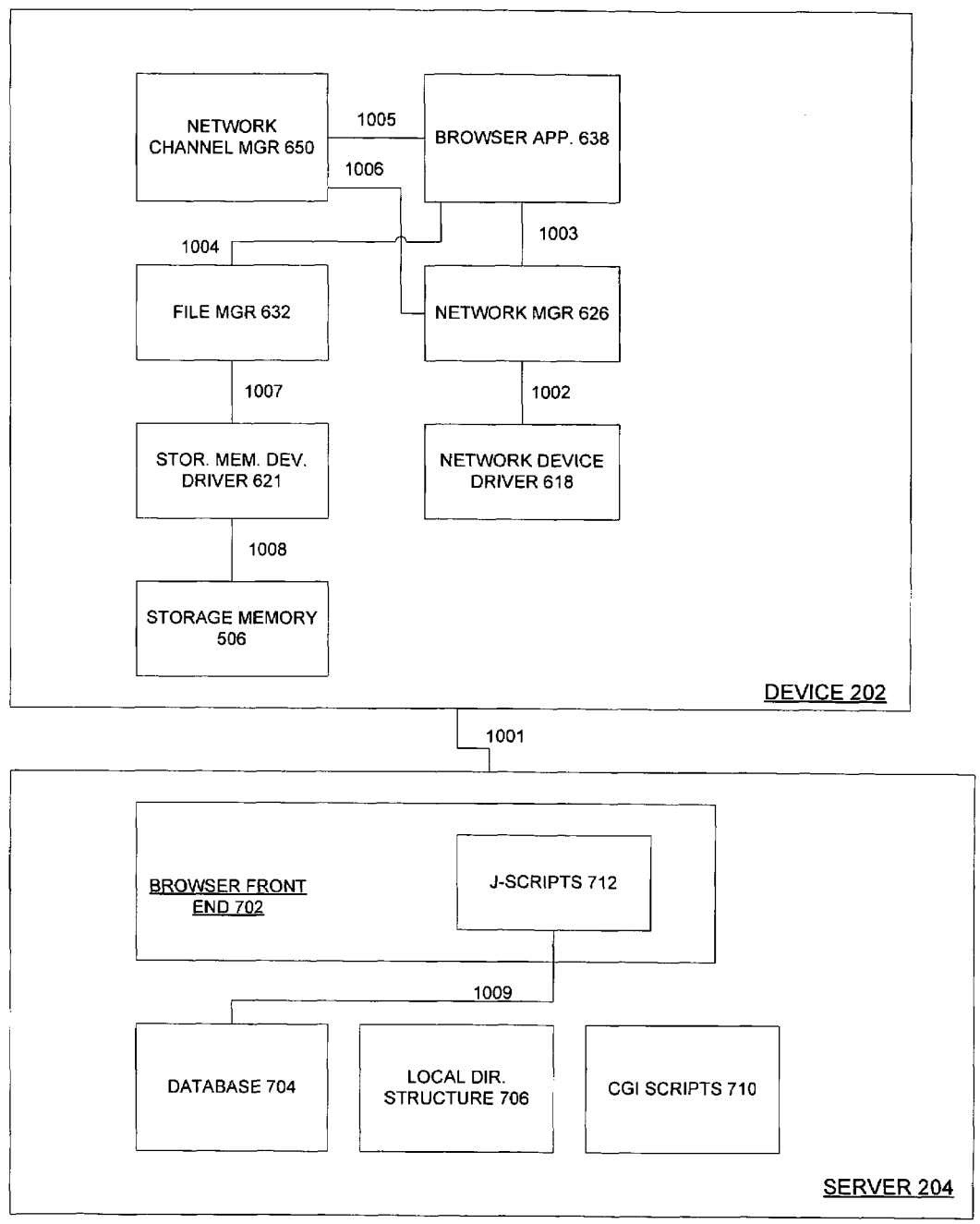
FIG. 10 illustrates an alternative embodiment of a data transfer between device 202 and server 204, according to embodiments of the present invention.

FIG. 10 illustrates an alternative embodiment of a data transfer between device 202 and server 204, according to embodiments of the present invention. Similar to FIGS. 8 and 9, in addition to components of device 202 and server 204, FIG. 10 includes communication paths 1001–1009, which are paths of communications within and between device 202 and server 204. Moreover, similar to the embodiments illustrated in FIGS. 8 and 9, server 204 can place the files having the data content for a given device 202 into designated directories.

For the embodiment illustrated in FIG. 10, communication between device 202 and server 204 are based on channels. In particular, a channel is defined to include a communication stream between device 202 and server 204 and is associated with a given input/output port of device 202 and 204. As shown in FIG. 10, communication path 1001 is the path of communication between device 202 and server 204 for such channels. In one embodiment, communication path 1001 represents one to any number of channels between device 202 and server 204.

In order to establish communication between device 202 and server 204, according to one embodiment of the present invention, server 204 establishes channel(s) between device 202 and server 204. Such channels can be established at different times and/or by different users or processes executing on server 204. For example, in one embodiment, such channels are established once device 202 is placed into the field (e.g., a store location) and powered on. In such an embodiment, these channels of communication are established by server 204 and are maintained. In another embodiment, these channels of communication can be established on when needed. For example, in one such embodiment, a given channel could be periodically be established to deliver periodic updates from server 204 to device 202. In another embodiment, a user of server 204 can establish and remove such channels of communication. However, embodiments of the present invention are not so limited, as other techniques can be employed to establish channels of communication between device 202 and server 204. For example, in another embodiment, device 202 establishes the channels of communication between itself and server 204.

In one embodiment, server 204 includes a network channel manager thereon (not shown), which serves as an abstract layer above the other software component on server 204. Accordingly, this additional layer isolates server 204 from complexities and inevitable changes associated with network protocols. In one embodiment, a particular type of channel is defined by a particular class within a set of class libraries for a given program language. For example, server 204 could include a class for a content delivery channel while having a different class for a control/status channel. In one embodiment, multiple channels can be established between device 202 and server 204 such that each channel is dedicated to a particular communication. As described above in conjunction with FIG. 6b, examples of the different type of channels include, but are not limited to, (1) a content usage channel, (2) a control/status channel, (3) a content delivery channel and (4) an error channel. Accordingly, communication path 1001 can represent one to any number of channels of communications between device 202 and server 204.

Once a given channel object is instantiated from a particular class, the given channel is established by server 204. In an embodiment, a given channel is established on a given input/output port of server 204. In particular, upon instantiation of a given channel class, the necessary connections are established. In one such embodiment, Transfer Control Protocol/Internet Protocol (TCP/IP) communications are established between device 202 and server 204, thereby employing a given TCP/IP port for a given channel. However, embodiments of the present invention are not so limited, as any other type of communication can be employed. For example, in another embodiment, a User Datagram Protocol (UDP) is employed in the communication between device 202 and server 204. Moreover, in one embodiment, handshaking mechanisms are used during the channels of communication, as are known in the art. In an embodiment, error checking mechanisms are employed in the channels of communication between device 202 and server 204, as are known in the art.

With regard to device 202, in one embodiment, network channel manager 650 listens for communication from server 204 on the different ports associated with the different channels. Upon receipt of a request to establish communication from server 204 on a given port, network channel manager 650 in device 202 initializes the associated channel. For example, server 204 may initiate a content delivery channel on port one in order to download new and/or updated data content to device 202. Moreover, in one such embodiment, multiple channels can be established between device 202 and server 204. For example, a content usage channel may be established to deliver usage statistics from device 202 to server 204 on port two, while at the same time a content delivery channel is established to download new and/or updated data content on port one. Additionally, communication paths 1002–1009 are similar to communication paths 802–809 of FIG. 8 and communication paths 902–909 of FIG. 9 with regard to the communications within device 202 and server 204. As illustrated, such channels of communication isolates changes within device 202 and server 204 to a limited number of software modules from changes and upgrades associated with network protocols.

Figure 11A:
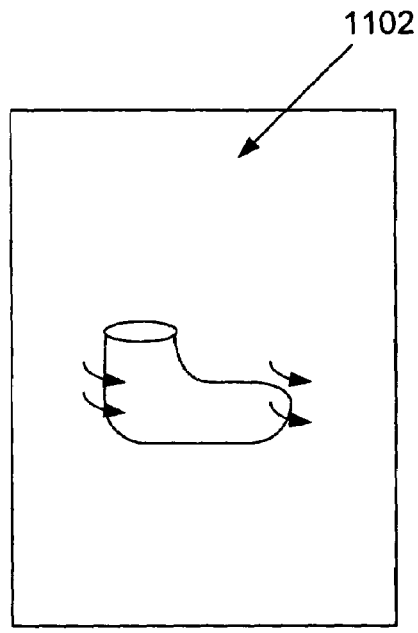
FIGS. 11a–11c illustrate an example of the overlaying of HTML content over the video content, according to embodiments of the present invention.
Figure 11B:
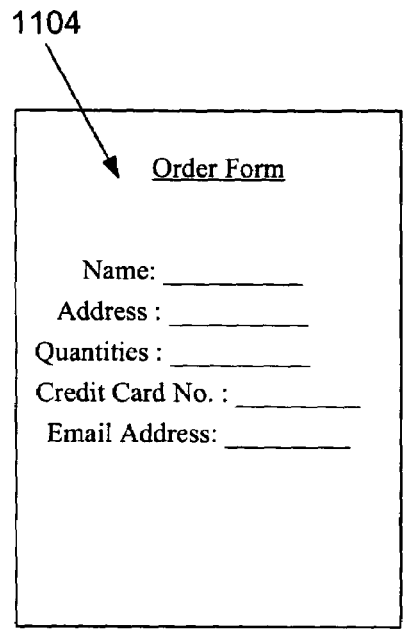
Figure 11C:
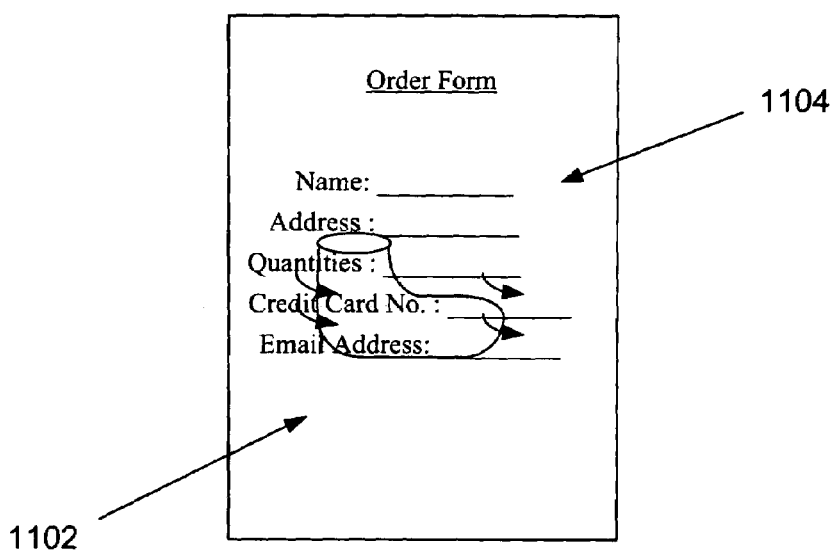

FIGS. 11a–11c illustrate an example of the overlaying of HTML content over the video content while in an active text mode, according to embodiments of the present invention. In particular, FIG. 11a illustrates video content of rotating shoe 1102; FIG. 11b illustrates HTML content of order form 1104; and FIG. 11c illustrates the overlay of order form 1104 onto rotating shoe 1102.

As previously described, the video content is stored on a multimedia disc, such as a DVD, being played by multimedia drive 502 within device 202, while the HTML content is stored in storage memory 506 of device 202 and can be dynamically updated by server 204. In one embodiment, the HTML content is the text portion of an HTML page from an Internet web site that has been retrieved from a remote server coupled to server 204. In particular, server 204 downloads the HTML page from a given remote server and modifies this page to remove graphics and video content associated with the HTML page, thereby leaving the data content, which is a low-bandwidth media to be subsequently downloaded into storage memory 506 of device 202. Therefore, the connection rate between server 204 and device 202 does not require a high-speed connection in order to download such HTML content into device 202 within an acceptable time period. In particular, any high-bandwidth media, such as video content, to be displayed on video display 504 is stored locally within a multimedia disc, which is shipped with device 202 and which can be exchanged for an updated multimedia disc once device 202 has been deployed.

A given HTML page from storage memory 506 is synchronized with portions of the video content from multimedia drive 502, which is described in more detail in co-filed, co-pending patent application titled, Integration of Passive Text in a Multimedia-Controlled Environment" to Susan Baum, Tom Dezoglio and Bhupesh Vyas. This synchronized content is transmitted to overlay unit 514 of device 202 (shown in FIG. 5). In one embodiment, overlay unit 514 removes the background from the HTML content. Accordingly, this removal of the background allows for the transparent overlay of the HTML content onto the video content, as illustrated in FIG. 11c. In particular, as illustrated in FIG. 11c, any background is removed from order form 1104, thereby leaving the data content of order form 1104 (e.g., name, address, etc). Overlay unit 514 integrates the data content of order form 1104 and the video content of rotating shoe 1102 to form a combined content of the text and the video into a single window, such that rotating shoe 1102 is in the background with order form 1104 being in the foreground.

Accordingly, this transparent overlay allow for portions of rotating shoe 1102 to be seen through order form 1104. In particular, overlay unit 514 receives the video content as a layer and the HTML content as a separate layer and combines these two layers into a single integrated layer, which is subsequently transmitted to video display 504 for display. This integration of the two layers by overlay unit 514 of device 202 is a recursive process, as overlay unit 514 continues to receive the video content and the synchronized HTML content and to combine the two layers for display on video display 504.

FIGS. 11a–11c are by way of example and not by way of limitation as other types of HTML content can be overlaid onto other types of video content to form a single integrated layer for display. For example, the HTML content could be a description or a sales promotion of a given vendor's product, as previously described. In a further example, the video content could show video of a particular vendor's trademark.

Figure 12:
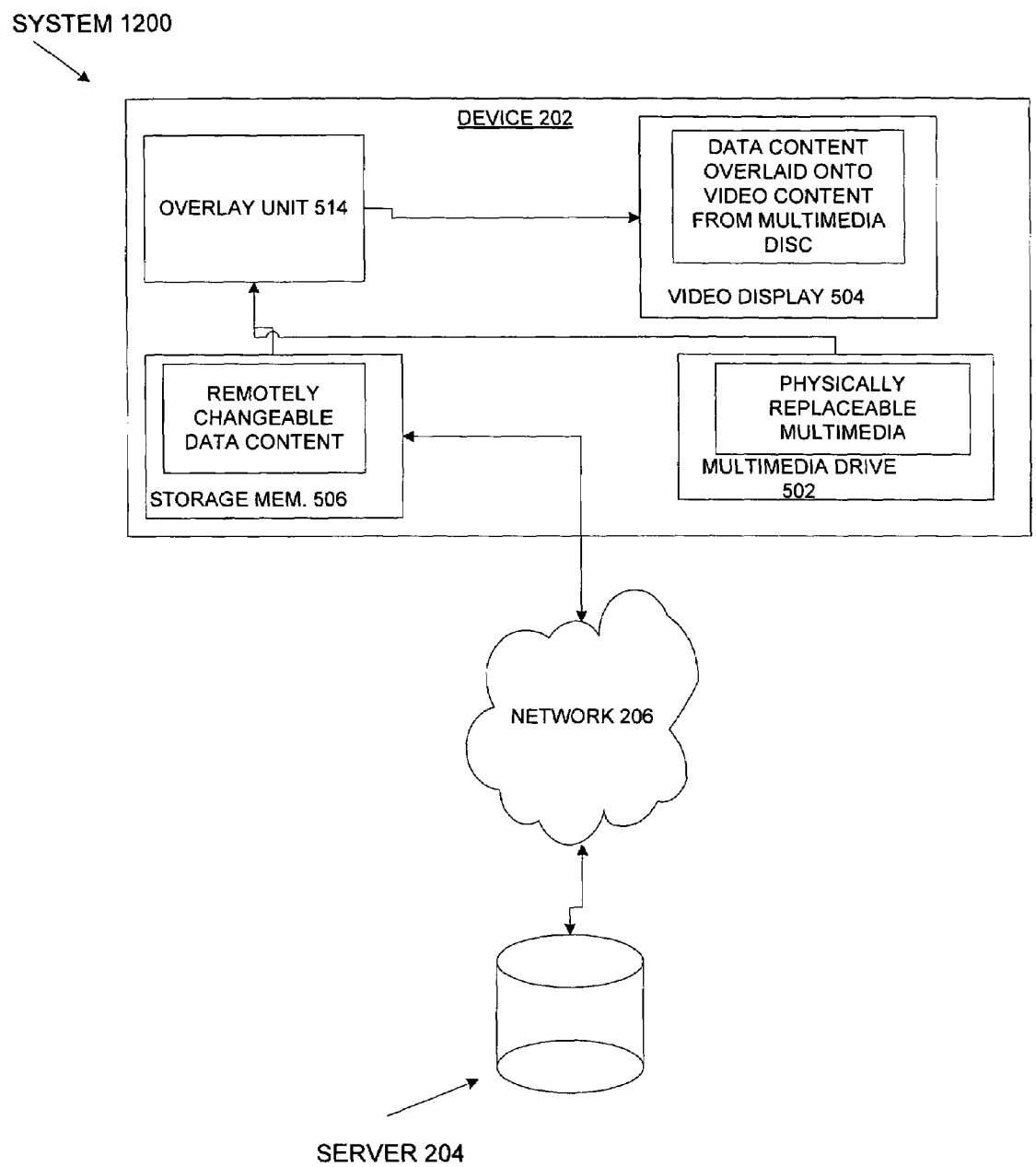
FIG. 12 is a system diagram illustrating the integration and overlaying of data content onto video content, according to embodiments of the present invention.

FIG. 12 is a system diagram illustrating the integration and overlaying of data content onto video content, according to embodiments of the present invention. In particular, FIG. 12 illustrates system 1200 that includes device 202, server 204 which are coupled together through network 206. Device 202 includes multimedia drive 502, storage memory 506, overlay unit 514 and video display 504. Additionally as shown, multimedia drive 502 includes physically replaceable multimedia. As previously described such multimedia can include a DVD that includes, for example, video content. Accordingly, this multimedia can be updated by physically replacing such media with another disc and/or the rewriting of such disc in cases wherein such discs are writable.

Moreover as shown, storage memory 506 includes remotely changeable data content. In particular, such data content can be updated by server 204 through network 206, thereby allowing for dynamic updates to such data content. In one embodiment, the data content within storage memory 506 is a low-bandwidth media in comparison to the physically replaceable media stored in multimedia drive 502, which is a high-bandwidth media. For example, the data content could include text content, while the physically replaceable media could include video content. Moreover, in one embodiment, device 202 are tailored to one or small number of vendors. As such, both the low-bandwidth and high-bandwidth media stored in device 202 can be fairly specific to a given vendor's products and/or needs.

Additionally, portions of the data content stored in storage memory 506 and the physically replaceable media stored in multimedia drive 502 are synchronized by processes executing within device 202, which is described in more detail in co-filed, co-pending patent application titled, Integration of Passive Text in a Multimedia-Controlled Environment" to Susan Baum, Tom Dezoglio and Bhupesh Vyas. Accordingly, portions of the data content along with the physically replaceable media would be transmitted in synchronization to overlay unit 514. Overlay unit 514 would then overlay the portions of the data content onto the physically replaceable media to form combined content in a single window. Overlay unit 514 then transmits this combined content to video display 504, which displays such content.

Memory 512 includes a machine-readable medium on which is stored a set of instructions (i.e., software) embodying any one, or all, of the methodologies described above. Software can reside, completely or at least partially, within memory 512 and/or within processor unit 510. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to distribute information, comprising:

storing markup language content in a plurality of directories, within a local directory structure in a central server, corresponding to a plurality of in-store kiosks, wherein the markup language content includes promotional information for sales of limited durations on store-specific products that are sold in different stores, where the plurality of in-store kiosks are located;

downloading the markup language content and configuration data via a network from the plurality of directories in the local directory structure of the central server into the corresponding plurality of in-store kiosks, wherein each of the plurality of in-store kiosks has an active screen display, a card swipe to receive information off a membership club card of end users, and is located in a different store;

retrieving, from a replaceable storage memory in each of the plurality of in-store kiosks, video content related to the store-specific products;

integrating the markup language content with the video content within each of the plurality of in-store kiosks by using a video manager to form dynamic advertising and changeable promotional information content for the sales of limited durations on the store specific products dedicated to some vendors that are sold in the different stores; and displaying the dynamic advertising and changeable promotional information content for the sales of limited durations on the store-specific products, on the active screen in each of the plurality of in-store kiosks, to promote the store-specific products dedicated to the particular vendors that are sold in the different stores and to move stagnant inventories within the different stores where each of the plurality of in-store kiosks is correspondingly located.

2. The method as in claim 1 wherein the replaceable storage memory comprises at least one of a FLASH memory, a DVD being played in a CD/DVD drive and a CD being played in a CD/DVD drive.

3. The method as in claim 1 wherein each of the plurality of in-store kiosks also has at least one of a keyboard, a touch screen, a printer, a microphone, and a motion sensor.

4. The method as in claim 1 wherein each of the plurality of in-store kiosks permits two way communication between that in-store kiosk and end-users when the video content and the mark up language combine to provide a responsive, up-to-date, easy-to-use interactive experience with an additional benefit of high-quality full motion video.

5. The method as in claim 4 wherein each of the video content and the mark up language combined to provide an integrated multimedia product presentation, sales promotion and/or allow for e-commerce transactions for given products of a particular vendor.

6. The method as in claim 1 wherein the plurality of in-store kiosks are dedicated to a given vendor's products or a set of products, permit two way communication between the plurality of in-store kiosks and end-users, and the video content and the mark up language include low-bandwidth media concerning latest product information or sales promotion for the products being sold in a given retail store.

7. The system as in claim 1 wherein the video content and the markup language combine to form up-to-date promotional offers for in-store merchandise.

8. A method to collect information, comprising:

storing markup language content in a plurality of directories, with a local directory structure in a central server, corresponding to a plurality of in-store kiosks, wherein the markup language content includes promotional information for sales of limited durations on store-specific products that are sold in different stores;

downloading the markup language content and configuration data via a network from the plurality of directories in the local directory structure of the central server into the corresponding plurality of in-store kiosks, wherein each of the plurality of in-store kiosks has an active screen display and each of the plurality of in-store kiosk is located in a different store;

retrieving video content from a replaceable storage memory in each of the plurality of in-store kiosks;

integrating the markup language content that includes the promotional information for the sales of limited durations on the store-specific products that are sold in the different stores with the video content by using a video manager in each of the plurality of in-store kiosks to form in-store product promotional presentations, wherein the plurality of in-store kiosks interact with end-users to promote and to move inventories within the different stores where each of the plurality of in-store kiosks is correspondingly located;

displaying the in-store product promotional presentations on the active screen on each of the plurality of in-store kiosks, wherein the product promotional presentations are directed to the sales of limited durations on the store-specific products sold in the different stores to provide responsive, up-to-date, interactive experiences with the additional benefit of high-quality full motion video and;

prompting the end users with dynamic, programmed questions after they initiate interaction with each of the plurality of in-store kiosks;

storing responses including users' personal information entered into each of the plurality of in-store kiosks via a data entry device by the end users;

uploading usage statistics compiled from the end users that are stored in each of the plurality of in-store kiosks to the central server via the network; and storing the usage statistics uploaded from each of the plurality of in-store kiosks into a central database in the central server for data mining purposes.

9. The method as in claim 8 wherein the replaceable storage memory comprises at least one of a FLASH memory, a DVD being played in a CD/DVD drive and a CD being played in a CD/DVD drive.

10. The method as in claim 8 wherein each of the plurality of in-store kiosk also has at least one of a card swipe, a keyboard, a touch screen, a printer, a microphone and a motion sensor.

11. The system as in claim 8 wherein each of the plurality of in-store kiosks permits two way communication between that in-store kiosk and end-users and the video content and the mark up language combine to include at least multiple-choice type questions for the end-users.

12. The system as in claim 11 wherein each of the plurality of in-store kiosks includes a card swipe to receive information off a membership club card of end users, and the video content and the mark up language combined to provide an integrated multimedia product presentation, sales promotion and/or allow for e-commerce transactions for given products of a particular vendor.

13. An apparatus comprising:

a plurality of devices in different retail stores acting as in-store kiosks to provide integrated multimedia product and sales promotion presentations, each of the plurality of devices including, a network connection to a network, a physically replaceable storage memory coupled to the network connection, having stored therein remotely changeable data content received over the network regarding latest product and sales of limited durations on store-specific products dedicated to some vendors in the retail store and full motion video content regarding the store-specific products being sold in the retail store, wherein, an active screen to display store-specific promotion presentations, a data entry device coupled to the active screen to receive store-specific usage data that includes end-user membership information and data inputs, and a processor coupled to the data entry device, the active screen, and the storage memory;

a video manager to integrate and display the video content and the remotely changeable data to form the store-specific promotion presentations on the sales of limited durations on the store-specific products sold in the store, a network manager to facilitate communication of the remotely changeable data content and the store-specific usage data that includes the end-user membership information and the data inputs, between the in-store kiosk and a plurality of servers through the network connection; and the plurality of servers coupled to each of the plurality of devices through the network to selectively distribute up-to-date versions of the remotely changeable data based on store-specific needs and to selectively upload the store-specific usage data from the in-store kiosks in the different retail stores.

14. The apparatus as in claim 13 wherein the replaceable storage memory comprises at least one of a FLASH memory, a DVD being played in a CD/DVD drive and a CD being played in a CD/DVD drive.

15. The apparatus as in claim 13 wherein the data entry device further comprises at least one of a card swipe, a key pad, microphone, buttons and a touch screen to receive end-user information from a membership club card.

16. The apparatus as in claim 13 wherein the plurality of devices permits two-way communication between a store and end-users to promote products being sold in the store and to provide a responsive, up-to-date, easy-to-use interactive experience with a benefit of high-quality full motion video.

17. The apparatus as in claim 13 wherein the remotely changeable content combines with the video content to provide an integrated multimedia product presentation, sales promotion and/or allow for e-commerce transactions for given products of a particular vendor available in the store.

* * * * *